United States Patent [19]
Dahan et al.

[11] Patent Number: 5,892,871
[45] Date of Patent: Apr. 6, 1999

[54] FIBER OPTIC CABLE TERMINATION

[76] Inventors: Michael Dahan, 4913 Good Hours Pl., Columbia, Md. 21044; John M. Ehrenreich, 5814 Edmondson Ave., Catonsville, Md. 21228

[21] Appl. No.: 741,115

[22] Filed: Oct. 30, 1996

Related U.S. Application Data

[63] Continuation-in-part of Ser. No. 571,782, Dec. 13, 1995, abandoned.

[51] Int. Cl.$^6$ .................................................... G02B 6/36
[52] U.S. Cl. ............................................. 385/86; 385/100
[58] Field of Search ............................. 385/100, 88, 89, 385/87, 76

[56] References Cited

U.S. PATENT DOCUMENTS

| | | | |
|---|---|---|---|
| 4,195,045 | 3/1980 | Mead | 264/1 |
| 4,330,171 | 5/1982 | Malsot et al. | 350/96.21 |
| 4,815,809 | 3/1989 | Szostak | 385/88 |
| 4,911,518 | 3/1990 | Miller | 264/1.5 |
| 5,071,218 | 12/1991 | Nishimoto | 385/60 |
| 5,193,133 | 3/1993 | Schofield et al. | 385/85 |
| 5,278,928 | 1/1994 | Ueda et al. | 385/78 |
| 5,390,272 | 2/1995 | Repta et al. | 385/100 |

*Primary Examiner*—Akm E. Ullah
*Attorney, Agent, or Firm*—Howard L. Rose

[57] ABSTRACT

The end region of an optical fiber cable is removed to expose the coated optical fiber and some of the cable reinforcing non-optical fibers. The coating is removed from the optical fiber which, when covered with glue or the like, is inserted into a hole in a ferrule. The hole is large enough to accept the uncoated fiber but not the coated fiber. Thus the ferrule is pushed onto the fiber until the coating is contacted insuring that no uncoated optical fiber is exposed. The uncoated length of the optical fiber is long enough to extend out the end of the ferrule remote from the cable and is removed flush with the end of the ferrule. The entire assembly, on an optical disconnect type, an end region of the cable, the non-optical fiber, the coated optical fiber extending between the cable and the ferrule and an end region of the ferrule adjacent the cable, are all encapsulated in an optical fiber connector which may be straight or angled at 45° or more in the region between the cable and the ferrule. A strain relief boot may be molded to the cable and has a thumb pad aligned with a connector key of the ferrule whereby the connector key although not visible may be aligned with the alignment slot in a connector to which the ferrule is to be connected.

In a further embodiment, the boot does not contact the optic fiber so that it is not placed under tension. Instead, the Kevlar fibers of the cable are embedded in the molded boot to absorb the stress developed between the cable and the connector.

16 Claims, 3 Drawing Sheets

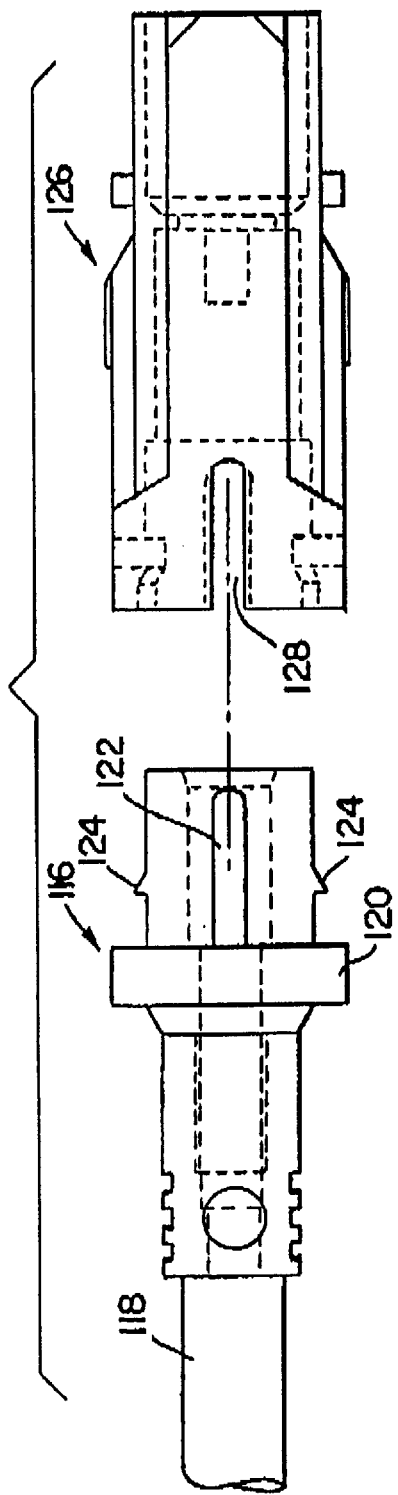
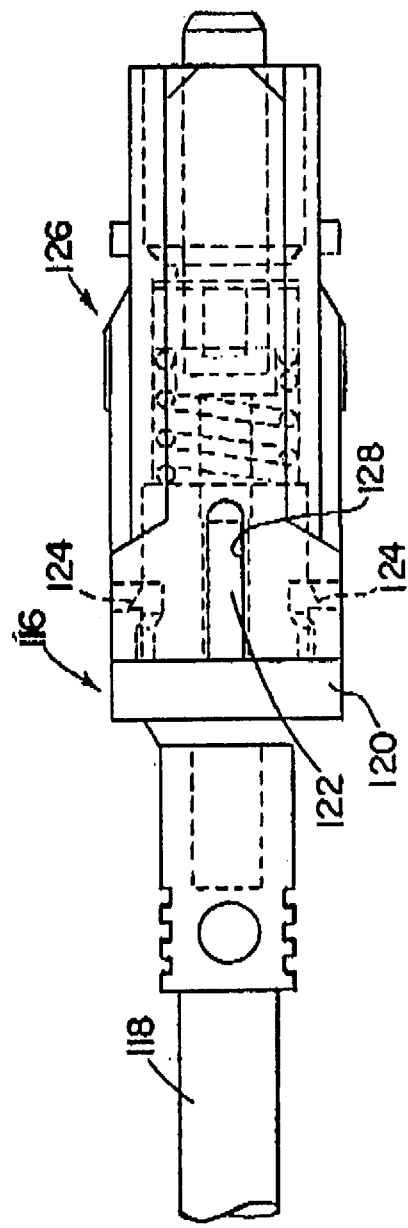

FIBER OPTIC CABLE TERMINATION

CROSS REFERENCE TO RELATED APPLICATIONS

This application is a continuation-in-part of application No. 08/571,782 filed Dec. 13, 1995 for "Fiber Optic Connector" which is now abandoned.

FIELD OF THE INVENTION

The present invention relates to a fiber optic connector and method of making same and more particularly to a method of attaching the fiber to a ferrule and total connector and the geometry of the total connector.

BACKGROUND OF THE INVENTION

There are numerous patents on various fiber optic connector structures and method of making them. One quite common way is to form the connector structure independent of the fiber inserting a connector with ferrule attached unto the fiber and gluing the fiber in place. A basic problem with such an approach is that the location of the end of the coating on the fiber and the beginning of the ferrule when inserted into the connector, neither of which are visible, cannot be precisely determined. It is known that in many instances an unsupported length of fiber exists between the end of the coating and the beginning of the ferrule. Such a structure is quite susceptible to failure as a result of the unsupported length of the optic fiber. Also, crimping is often used to hold the structure together.

A further problem with the prior art devices is failure of the cable where it joins the connector body. The use of flexible strain reliefs is common but the prior art strain relief devices do not bond directly to the cable jacket. An adhesive compound is often used to affix the strain relief boot to the cable jacket and connector body.

The connectors are provided with a key for alignment with its mating interface or the like but the key is often difficult to see during connector and cable installation into mating interface.

A further problem with the prior art optical cable termination is the diversity of connectors and the problems inherent with adapting a cable-ferrule combination that can be readily adapted to a multiplicity of different connectors.

OBJECTS OF THE INVENTION

It is an object of the present invention to provide a novel method of manufacturing a fiber optic connector.

It is another object of the present invention to provide a method of manufacture of a fiber optic connector in which it is assured that a gap does not exist between the coated region of the optic fiber and the ferrule to which it is secured.

Still another object of the present invention is to provide a method of making an optic connector and to provide an optic connector.

Another object of the present invention is to provide an optical fiber connector that eliminates the need for crimping a jacket that is disposed over the fiber, improves jacket retention with or without crimping, reduces costs and provides complete encapsulation from the cable to the ferrule including the buffer zone between the cable and the ferrule all in one operation.

Yet another object of the present invention is to provide a fiber optic connector with a strain relief boot that assists in alignment with the connector to which the fiber optic interface which it is to be mated.

Still another object of the present invention is to provide the fiber optic cable connected to a ferrule with a means for accurately aligning the connector with the interface to which it is to be mated.

Another object of the present invention is to provide a body molded to a fiber optic cable that can mate with many different adapters that are uniform configuration for connection to the body molded to the cable but can be selected for connection to many different configurations of external connectors and which can be used in connection with an overmolded strain relief and overmolded connector body on the cable.

BRIEF DESCRIPTION OF THE PRESENT INVENTION

In accordance with the method of the present invention, an end region of the cable covering is removed to expose the coated optical fiber. The optical fiber has a length of its protective coating removed leaving a length of fully exposed fiber. The exposed region of the fiber is inserted into a ferrule until the end of the coated region of the fiber contacts the ferrule. The coating is in full contact with one end of the ferrule so that no uncoated region of fiber exists between the cable and the ferrule while a length of uncoated fiber protrudes from the opposite or signal transmission end, the end that mates with another fiber or terminal for the ferrule. The fiber is glued in the ferrule and the connector body is molded about a region of the fiber optic cable and a region of the ferrule including the region between the cable and the ferrule and a part of the ferrule body. The end of the fiber extending out of the contact end of the ferrule may then be removed or may have already been removed. It should be noted that the ferrule is notched adjacent the fiber insertion region so that upon encapsulation the cable and ferrule are anchored to one another so that the ferrule cannot be pulled out of the connector ensuring longevity and durability of the product.

In molding the connector about the fiber optic cable the connector b may be angled relative to the center line of the ferrule whereby to reduce the extension of the connector away from the terminal to which it is to be connected.

To protect the junction between the cable and the ferrule, a boot is molded over the region of the junction and has a thumb pad that is aligned with the connector key or other alignment feature to thus render alignment of the connector's key with the key way on the element to which the connector is to be coupled.

In a further feature of the invention a body is molded to the cable prior to molding of the strain relief boot, the boot being molded over the aforesaid body. This body provides a member for latching to a further member that is removably slidable over the ferrule. This latter member comes in many configurations at one end and a standard configuration at the other end. The standard configuration is for coupling to the member molded to the cable. The ends of the one end of the latter member of each different configuration provides couplings to many different fiber optic connectors on the market. The user merely selects from the variety of coupling ends offered the one that mates with his or her connector.

The above and other features, objects and advantages of the present invention, together with the best means contemplated by the inventor thereof for carrying out the invention will become more apparent from reading the following description of a preferred embodiment and perusing the associated drawings in which:

BRIEF DESCRIPTION OF THE DRAWINGS

FIG. 6 illustrates a top view of one type of non-optical disconnect fiber optic connector, with overmolded rear body on cable;

FIG. 7 is a top view of the adapter of FIG. 6 shown with spring and fiber optic ferrule, assembled within body assembly;

DETAILED DESCRIPTION OF THE PRESENT INVENTION

Figure 1:
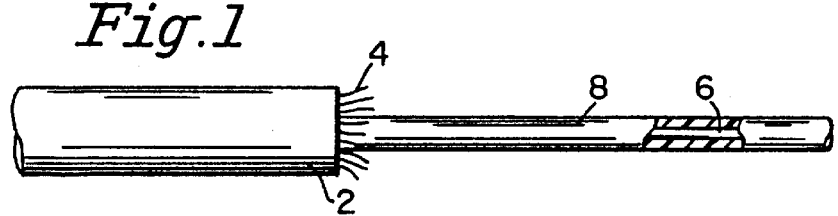
FIG. 1 illustrates a fiber optic cable with the outer sheath removed, and the cable strengthening fibers exposed as well as a length of coated optical fiber.

Referring now to FIG. 1 of the accompanying drawings, an optical fiber cable 2 is illustrated with one end removed. Cable reinforcing fibers 4 are deliberately permitted to extend out of the cable to help provide a strong bond between the cable and the completed connector. The fibers may be of Kevlarl™, a quite strong material, or of other fibers fabricated from materials with like characteristics. An optical fiber 6 with a coating 8 extends a predetermined distance from the end of the cable 2.

Figure 2:
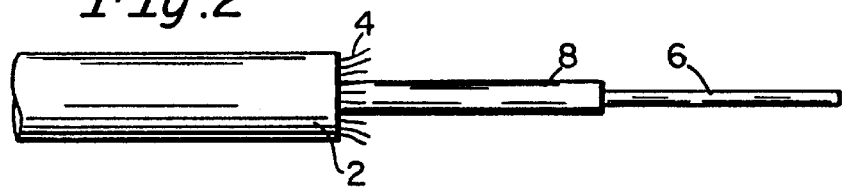
FIG. 2 illustrates the cable, exposed strengthening fibers and the optical fiber with a length of fiber with the coating removed.
Figure 3:
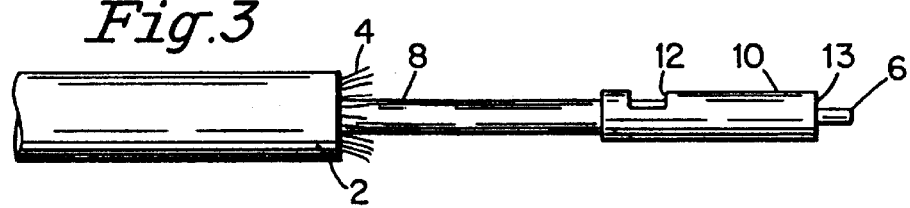
FIG. 3 illustrates the fiber with the length of the fiber with the coating removed disposed in a previously fabricated ferrule.

Referring to FIG. 2, a length of the coating 8 over the exposed fiber 6 is removed so that the optic fiber 6 may be inserted into a conventional ferrule 10 as illustrated in FIG. 3.

Referring to FIG. 3, the fiber 6 is coated with an adhesive and inserted into the ferrule 10. The hole through the ferrule is chosen to be only large enough to receive the optical fiber with a thin coating of glue but not large enough to accept the fiber 6 with the coating 8. The fiber 6 is inserted into the ferrule until the coating 8 is in direct contact with the ferrule so that no uncoated fiber exists between the ferrule and the cable 2. The uncoated length of the fiber 6 is made long enough that it passes through the ferrule 10 and out the end 13. Once the glue holding the fiber 6 in the ferrule 10, the end of the uncoated fiber 6 extending from ferrule 10 may be removed or may be removed after completion of the process. It should be noted the ferrule 10 has a notch 12 formed towards the region of the ferrule closest to the cable.

Figure 4:
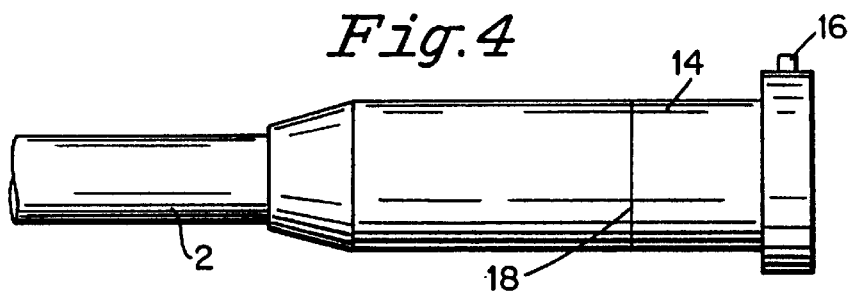
FIG. 4 illustrates the cable, optical fiber and ferrule encapsulated in the connector body.

Referring to FIG. 4 illustrating one view of a completed connector, a length of the cable 2, the coated fiber extending between the cable and the ferrule and a region of the ferrule including the notch 12 are encapsulated within a standard connector format 14 including an alignment key 16. The position of the notched end of the ferrule in the final assembly is designated by the dashed line 18.

Figure 5:
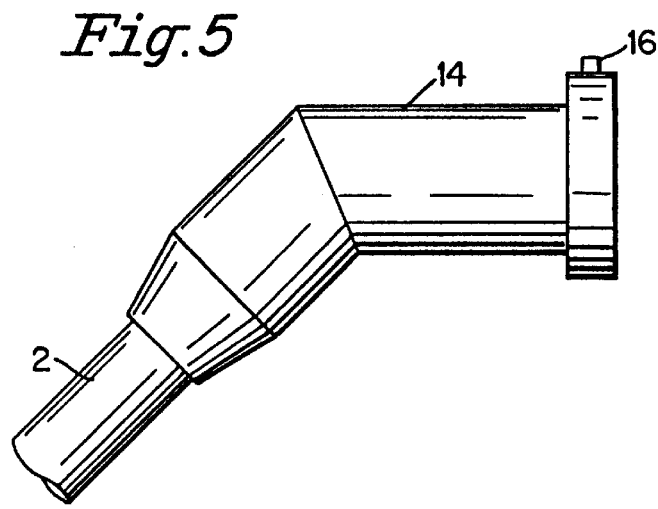
FIG. 5 illustrates the cable, optical fiber and ferrule encapsulated in an angled connector body.

Referring now to FIG. 5 there is illustrated a further embodiment of the present invention wherein the connector body is molded with preferably a 45° angle in the region between the cable 2 and the end of the ferrule 10.

It can be seen that the method of the invention and the resulting product provide a quick production, (four step process), of a compact and strong final product. No uncoated region of the optical fiber is exposed except the very end that must be exposed to permit transmission of signals. No crimping is required, jacket retention and cable retention is improved by embedding of the outer jacket and fibers 4 in the plastic of the outer connector body 14 and the notched ferrule is positively retained. Further, the cable end of the connector body may be angled to reduce the axial length of body extending from the connection point.

Referring now specifically to FIGS. 6 and 7 of the accompanying drawings, the universal adapter of the invention consists of several parts. A first of the parts is molded to the cable and the other parts may be any configuration required for a particular fiber optic interface, and are disposed over the ferrule and latched to the first part that is molded to the cable.

The first part as set forth above is a member 116 molded to the cable 118 and is fabricated from a rigid material. The member 116 is provided with a stop 120, a rib 122 and two latch hooks 124. An adapter 126 is disposable over the ferrule of the connector. The adapter 126 has a channel 128 to receive the rib 122 and thus provide provides alignment of the two parts.

The adapter 126, see FIG. 7, has two shudders 130 to the right of which as viewed in FIG. 7 the hooks 124 are seated when the members 116 and 126 are mated. The adapter 126 is seated against stop 120 when the members are latched.

The right end of member 126 as viewed in the Figures may take many different forms to adapt to various different connectors in the market.

Figure 8:
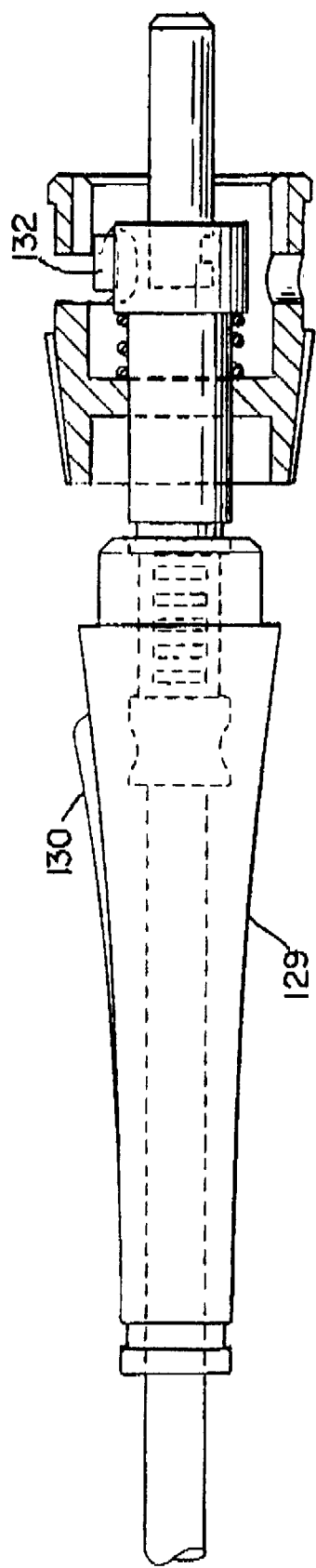
FIG. 8 illustrates the strain relief boot of the present invention.

Referring now to FIG. 8, a strain relief boot 129 is molded over the cable and the member 116 of FIGS. 6 and 7. The boot is provided with a thumb pad 130 aligned with connector key 132 of the ferrule. Thus even though the view of the key 132 may be blocked or hidden from view during installation into the mating member, ready alignment of the key with the connector it is to be coupled to, the thumb pad 130 overcomes the problem of limited visibility.

Figure 9:
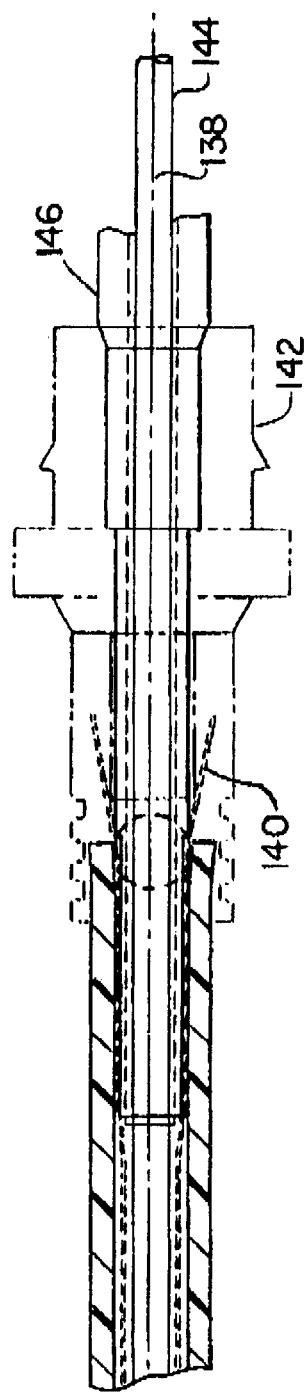
FIG. 9 illustrates an embodiment of the invention.

Referring now specifically to FIG. 9 of the accompanying drawings, there is illustrated a further embodiment of the present invention in which fiber optic 138 is not contacted by the molded strain relief covering and thus is not placed under strain. In this embodiment the strain is taken by Kevlar fibers 140 of the cable that are embedded in rear body 142 of the molded strain relief boot.

In order to prevent the optic fiber 138 and its inner fiber buffer 144, a core pin 146 is placed over the buffer 144 during the molding operation. The core pin is removed after the molding operation.

Once given the above disclosure, many other features, modifications and improvements will become apparent to the skilled artisan. Such features, modifications and improvements are, therefore, considered to be a part of this invention, the scope of which is to be determined by the following claims.

We claim:

1. An optical fiber connector incorporating a ferrule formed by the steps of removing a length of an end of a cable containing a coated optical fiber and reinforcing nonoptical fibers to expose a length of the coated optical fiber, removing a length of the coating about the fiber sufficient to permit the uncoated fiber to extend through the ferrule having an axial passage only large enough to accept the optical fiber, inserting the uncoated optical fiber with sealant into one end of the ferrule until the coating on the fiber contacts the ferrule with a length of uncoated optical fiber extending beyond the other end of the ferrule, removing the uncoated optical fiber extending beyond the ferrule, and encapsulating a region of the end of the cable, the length of coated optical fiber extending between the cable and the ferrule and a region of the ferrule adjacent the coated length of optical fiber to produce the final form of the connector body.

2. An optical fiber connector formed by the method of claim 1 including the further step of enclosing within the connector a notch formed adjacent the one end of the ferrule.

3. An optical fiber connector formed by the method of claim 2 including the step of exposing lengths of the reinforcing fibers so that they extend beyond the cable and are enclosed within the material encapsulating the structure to form the connector body.

4. An optical fiber connector formed by the method of claim 2 including the step of exposing lengths of the protection fibers so that they extend beyond the cable and are enclosed within the material encapsulating the structure to form the connector body.

5. An optical fiber connector formed by the method of claim 2 including the step of forming the connector body with an obtuse angle at the region between the cable and the ferrule.

6. An optical fiber connector formed by the method of claim 2 including the step of forming a shoulder on the end of the encapsulating body over the ferrule with an alignment key.

7. A strain relief boot for a fiber optic cable terminated in a ferrule and a connector body having a connector key comprising a connector body, a flexible boot molded to said cable adjacent said connector body, said boot having a thumb pad in alignment with said connector key.

8. An adapter for an optic fiber cable terminating in a ferrule comprising a first member molded to said cable adjacent said ferrule, a plurality of different second members having a first end sized to slide over said first member, each said second member having one end, each of which have different second ends to mate with different connectors.

9. The method of manufacture of an optical fiber connector incorporating a notched ferrule on the end of a cable containing a coated optical fiber surrounded by reinforcing fibers and comprising the steps of removing a length of an end of a cable to expose a length of the coated optical fiber, removing a length of the coating about the optical fiber sufficient to permit the uncoated fiber to extend through a ferrule having an axial passage only large enough to accept the optical fiber, inserting the uncoated optical fiber with glue into one end of the ferrule until the coating on the fiber contacts the ferrule with a length of uncoated optical fiber extending beyond the opposite end of the ferrule, removing the part of the uncoated optical fiber extending beyond the opposite end of the ferrule, and encapsulating a region of the end of the cable, the length of coated optical fiber extending between the cable and the ferrule and a region of the ferrule adjacent the coated length of optical fiber to produce the final form of the connector body.

10. The method according to claim 9 including the step of enclosing within the connector the notch formed adjacent an end of the ferrule facing the cable.

11. The method according to claim 10 including the step of exposing lengths of the fiber optic fiber protection fibers in the cable so that they extend beyond the cable and are enclosed within the material encapsulating the structure to form the connector body.

12. The method according to claim 9 including the step of exposing lengths of the protection fibers so that they extend beyond the cable and are enclosed within the material encapsulating the structure to form the connector body.

13. The method according to claim 9 including the step of forming the connector body with an obtuse angle at the region between the cable and the ferrule.

14. The method according to claim 9 including the step of forming a shoulder on the end of the encapsulating body over the ferrule with an alignment key.

15. The method of manufacture of an optical fiber connector on a cable including the steps of attaching a ferrule to the center conductor of the cable, forming over the ferrule a connector on the cable with a connector key, molding a strain relief boot Onto the cable adjacent the ferule with a thumb pad in alignment with the connector key of the connector.

16. The method of manufacture of an optical fiber connector including the steps of molding a first body to the jacket, strength members and optical fibers of a cable adjacent the ferrule with a rib and a pair of hooks, sliding an adapter having a channel for receiving the rib and having shoulders over which the hooks slide and catch, and providing a plurality of such adapters with different ends remote from its channel for mating with various different configurations of connectors.

* * * * *